UNITED STATES PATENT OFFICE.

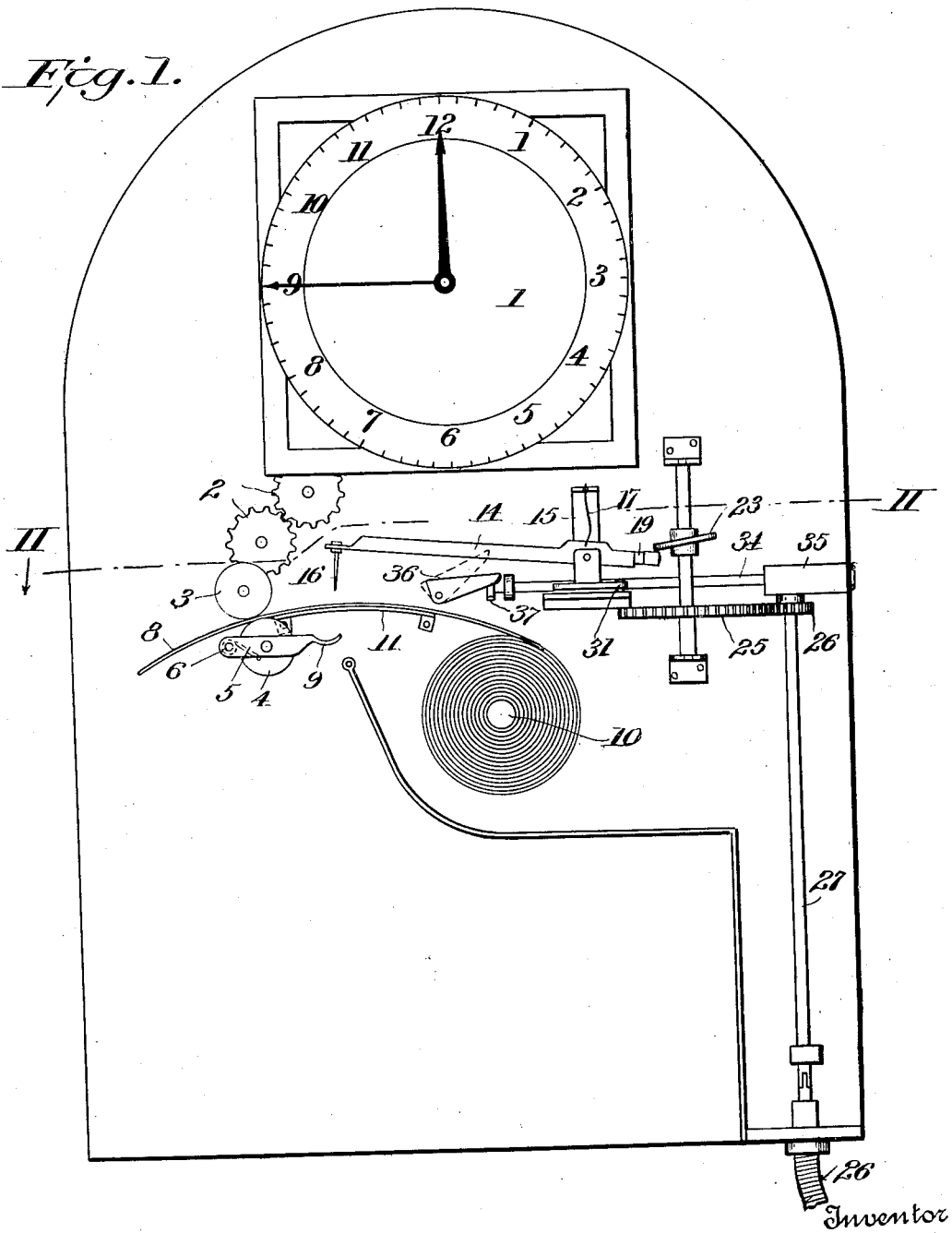

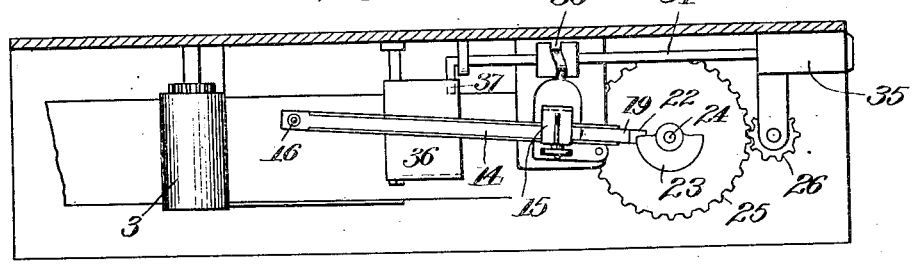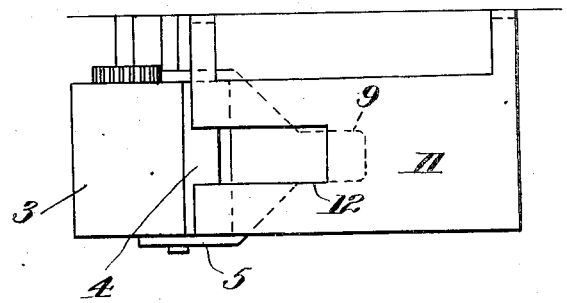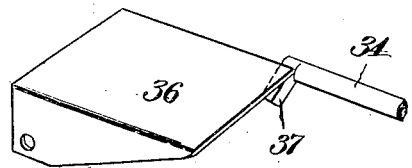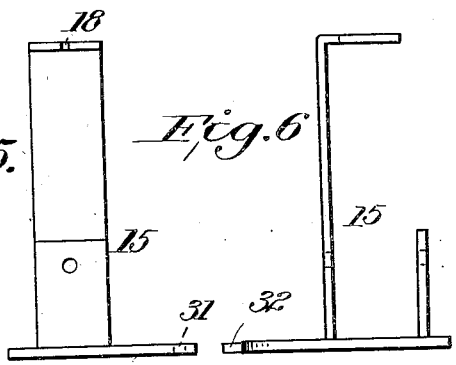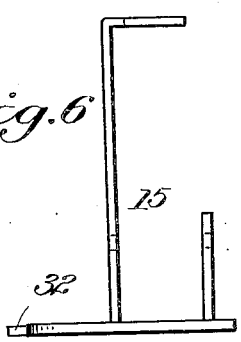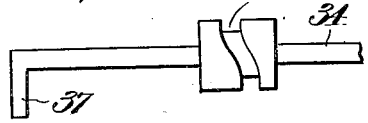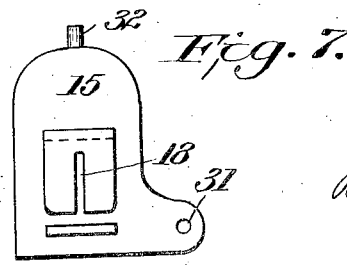

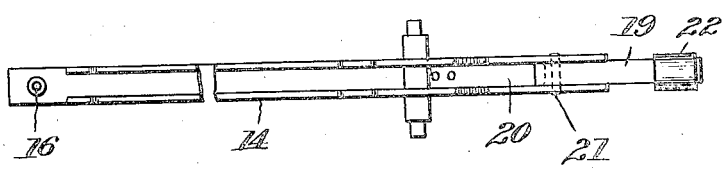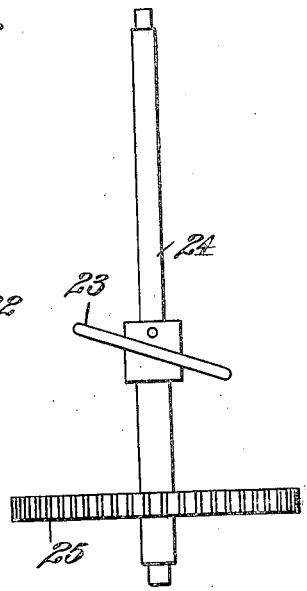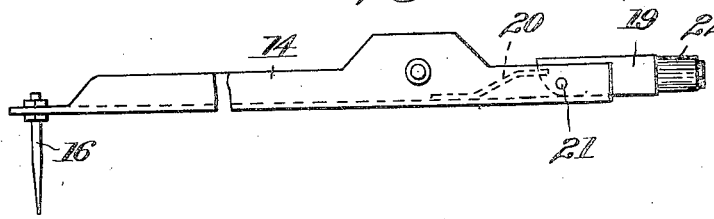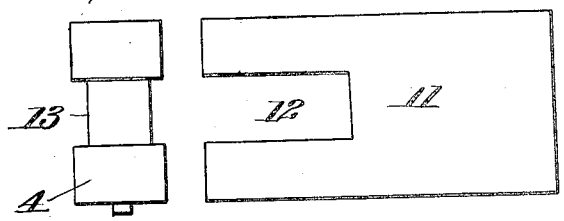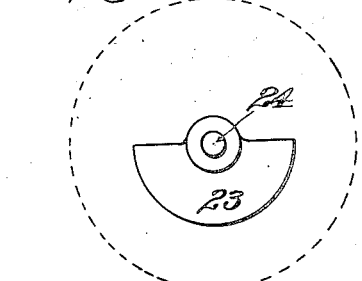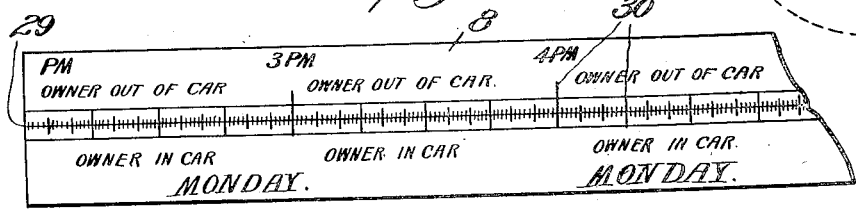

FRANK GRANSBURY, OF NEW YORK, N. Y.

TIME-RECORDER FOR AUTOMOBILES.

1,183,969.  Specification of Letters Patent.  Patented May 23, 1916.

Application filed April 23, 1915. Serial No. 23,492.

*To all whom it may concern:*

Be it known that I, FRANK GRANSBURY, a citizen of the United States, residing at New York, in the county and State of New York, have invented certain new and useful Improvements in Time-Recorders for Automobiles, of which the following is a full, clear, and exact specification.

This invention relates to recording attachments for automobiles, and has for its object to provide means for keeping a check on the time during which the automobile is operated and also upon the user of the car. In short, the present invention enables the owner of an automobile to tell how long he uses the car himself and also how long it is used by others and, therefore, serves as a means for detecting and preventing unauthorized use of the machine.

The invention will be first hereinafter described in connection with the accompanying drawings which constitute part of this specification, and then more specifically defined in the claims at the end of the description.

In the accompanying drawings, wherein similar reference characters are used to designate corresponding parts throughout the several views: Figure 1 is a front elevation of apparatus constructed substantially in accordance with my invention. Fig. 2 is a horizontal section on the line II—II of Fig. 1. Fig. 3 is a detail plan view of the apron for supporting the tape below the perforating point, and the feed rollers for the tape. Fig. 4 is a detailed perspective view of the pivoted leaf for raising the recorder arm prior to the shifting or oscillation of said arm. Figs. 5 and 6 are detailed front and side elevations of the bracket upon which the recorder arm is pivotally supported, the same being drawn to an enlarged scale. Fig. 7 is a plan view of the same bracket. Fig. 8 is a detailed view of the rock shaft which operates the bracket and the recorder raising leaf and which is controlled by the lock. Figs. 9 and 10 are detailed plan and side views of the recorder arm, showing more particularly the rule-jointed end piece, which extends into the path of the cam on the operating shaft. Fig. 11 is a detail view of the operating shaft. Fig. 12 is an end view thereof. Fig. 13 is a detail view of the lower tape-feeding roller. Fig. 14 is a detail plan view of the apron or supporting plate for the tape, and Fig. 15 is a plan view of a portion of the tape used in connection with the invention.

The movement of a clock 1 is operatively connected by a train of gears 2 to the upper roller 3 of a pair of tape-feeding rollers, see Fig. 1, so that said roller will move a tape the proper distance during each hour or other space of time, as will later on be more fully explained. The lower feed roller 4 is journaled in a frame 5 pivoted at 6 and pressed by a spring 7 so as to hold the tape 8 firmly against the roller 3. The frame 5 may be provided with a finger piece 9 for moving the roller 4 away from the roller 3 to permit a new roll of tape to be more readily inserted between the rollers.

Between the feed rollers and the spool 10 on which the tape is mounted, there is arranged an apron or supporting plate 11 over which the tape must pass as it is fed from the spool 10 to the rollers 3 and 4. This apron 11 is slotted, as at 12, Fig. 14, to permit the recorder point to pass entirely through the tape without coming in contact with the apron. The lower roller 4 may also be grooved, as at 13, Fig. 13, so as to permit the punched places in the tape to pass through the rollers without being disturbed or closed up, as would be the case if said roller were smooth like the upper roller 3.

The recorder arm 14 is pivotally mounted on a bracket 15 and has one end equipped with a perforating point 16 arranged above the slot 12 in the apron 11. This arm is connected to a spring 17 which tends to force the point-carrying end downward so as to perforate the tape 8. Said spring, as shown, is in the form of a leaf or plate having one end fixed in a transverse slot 18 in the top of the bracket 15, and the other end secured to the top face of the arm just above its pivot, so that when the point carrying end of the arm is raised, the spring is buckled and thus put under tension which will swing said point-carrying end of the arm downward as soon as released. The other end of the arm 14 carries a rule-jointed section 19 normally held in alinement with the arm by a spring 20, Figs. 9 and 10, and pivoted at 21. Said section 19 carries a roller bearing 22 which extends into the path of a cam 23 on a shaft 24. This shaft carries a gear 25 which meshes with a gear 26 on a shaft 27 which is connected by means of a flexible shaft 28, Fig. 1, to a part of the machine which will communicate any movement of the vehicle. It will thus be seen that whenever the automobile moves forward, the cam 23 will successively act upon the recorder arm 14 for raising its point carrying end, and releasing said arm so that said end will fall under the influence of the spring 17 and punch the tape 8 above the opening or slot 12 in the apron 11. When the machine is moved in a backward or reverse direction, the rule-jointed piece 19 will simply be swung up and down by the cam 23 without operating the recorder arm which will then remain in its normal horizontal position with its point 16 spaced slightly above the tape. It will be understood that after the arm is raised by the cam during the forward movement of the vehicle, the tension of the spring 17 is sufficient to swing the point 16 down past its normal position so as to perforate the tape, but that the normal position of said point when the vehicle is running backward or not running at all and the cam 23 is not in engagement with the roller bearing 22, is above and out of contact with the tape, the arm being in a horizontal position as already stated.

As illustrated in Fig. 15, the tape 8 is divided down the center by a line 29 and bears transverse marks 30 indicating units of time. The tape may also have printed upon it other indicia, such as the days of the week or month and the hours of the day and night. Below the longitudinal dividing line 29, the tape may have printed thereon at suitable intervals the words "Owner in car," while above said line the words "Owner out of car" are printed at suitable intervals. It will be understood that the longitudinal dividing line 29 is arranged about midway of the slot 12 in the apron 11, so that by slightly shifting or oscillating the recorder arm 14, the point 16 may be made to perforate the tape on either side of said line, according to how said arm has previously been set.

To permit the recording arm to be oscillated, the bracket 15 on which it is pivoted is adapted to be swung on a pivot 31. Said bracket carries a projecting pin 32' on its end farthest removed from the pivot 31, and said pin engages a cam groove 33 in a rock shaft 34 which is controlled by a lock 35. As long as the key is out of the lock, the bracket 15 will remain in a position where the arm 14 carrying the point 16 will move in a vertical plane which will cause said point to perforate the tape on the side of the longitudinal dividing line 29 bearing the words "Owner out of car," as at 37 in Fig. 15. When the key to the lock is inserted and turned, the shaft 34 is rocked and causes the cam 33 to oscillate or swing the bracket 15 upon its pivot 31 sufficiently to move the point carrying end of the arm 14 from above the side of the tape, just referred to, to a position above the other side thereof which bears the words "Owner in car." The owner being presumed to be the only one provided with a key to the lock 35, it will be impossible for unauthorized persons to use the car without leaving a tell-tale of the fact upon the tape which being moved by the clock work in accordance with the transverse marks 30 and other indicia on the tape relating to units of time, will also contain an accurate statement of the length of time the car has been in use. This time recording feature of the invention will be just as useful when the owner is running the car himself as at other times. By way of illustration, the dotted line 38 in Fig. 15 shows that the car was used by the owner from 4 to 4.30 p. m., while the dotted line 37 in the same figure indicates that the car was used by somebody else between 3 and 4 p. m.

In order to prevent any possibility of the point 16 tearing the tape when the arm 14 is oscillated, I provide a pivoted leaf 36 engaging a lug 37 on the rock shaft 34 and adapted to be raised by said lug when the rock shaft is turned by the key to the lock, this raising of the leaf 36 taking place before the bracket 15 is oscillated. When the leaf 36 is raised it engages the arm 14 and raises the same clear of the tape before said arm is oscillated by means of the cam 33 acting upon the pin 32 on the bracket 15.

Having thus described my invention, what I claim as new and desire to secure by Letters Patent of the United States is:—

1. The combination with a clock movement, of a feed roller operatively connected to the clock movement, a tape having a longitudinal dividing line and also divided into spaces on each side of said line indicating units of time corresponding to the rate at which said tape is moved by the feed roller, a recorder arm, means operatively connected to the driving gear of a vehicle for swinging the end of the arm toward and away from the tape, said arm being normally arranged with its recording end at one side of the dividing line on the tape, a lock, and means controlled by the lock for oscillating said arm to move its recording end to the other of the longitudinal dividing line on the tape.

2. The combination with a pivoted recorder arm, of a rule-jointed end piece thereon, and an actuating cam to engage said rule-jointed end piece for swinging the arm when the cam is turned in one direction and for simply swinging the rule-jointed end piece with respect to the arm when the cam is turned in the opposite direction.

3. The combination with a recorder arm, of a bracket on which said arm is pivoted, said bracket having a portion extending above and overhanging the arm at the pivot, a leaf spring having one end secured to the arm directly above its pivot and the other end fixed to the overhanging portion of the upward projection on the bracket for normally holding the arm in a horizontal position, and means for swinging said arm on its pivot.

4. The combination with a bracket pivoted to oscillate in a horizontal plane, of a recorder arm pivoted on said bracket to swing in a vertical plane, means for swinging said arm, a lock, and means controlled by said lock for oscillating said bracket.

5. The combination with a bracket pivoted to oscillate in a horizontal plane and having a projecting pin, of a recorder arm pivoted on said bracket to swing in a vertical plane, means for swinging said arm, a lock, and a cam engaging the projecting pin on the bracket and controlled by the lock for oscillating the bracket.

6. The combination with a bracket pivoted to oscillate in a horizontal plane, of a recorder arm pivoted on said bracket to swing in a vertical plane, means for swinging said arm, means for oscillating said bracket, and means controlled by said oscillating means for limiting the swinging movement of the arm while the bracket is being oscillated.

7. The combination with a bracket pivoted to oscillate in a horizontal plane, of a recorder arm pivoted on said bracket to swing in a vertical plane, a pivoted leaf below the arm, a rock shaft having means for oscillating the bracket, and a lug on the rock shaft for raising the pivoted leaf to limit the swinging movement of the arm while the bracket is being oscillated.

8. The combination with a bracket pivoted to oscillate in a horizontal plane, of a recorder arm pivoted on said bracket to swing in a vertical plane, means for swinging said arm, a pivoted leaf arranged below the arm, a rock shaft having means for oscillating the bracket, a lock controlling the rock shaft, and a lug on said rock shaft for raising the pivoted leaf to limit the swinging movement of the arm while the bracket is being oscillated.

9. The combination with a tape, of a pair of feeding rollers between which the tape is passed, a slotted apron for supporting the tape before it passes between the rollers, the slot in said apron opening on the end thereof adjacent to the feeding rollers, and a point carrying arm movable toward and away from the tape for perforating the portion thereof which overlies the slot in the apron, the lower roller having a groove in its face in line with the slot in the apron for the purpose specified.

10. The combination with a tape having a longitudinal dividing line, of means for moving said tape longitudinally, a bracket swiveled to swing horizontally, a recorder arm pivoted on said bracket to swing vertically, a point on the end of the arm normally in position to punch the tape at one side of its dividing line, a lock, and means controlled by said lock for oscillating the bracket to shift the arm so that its point will punch the tape on the other side of its dividing line.

In testimony whereof I have signed my name to this specification in the presence of two attesting witnesses.

FRANK GRANSBURY.

Witnesses:
G. M. PREISSINGER,
WM. C. MOORE.